United States Patent [19]

Sasamura et al.

[11] Patent Number: 4,635,134
[45] Date of Patent: Jan. 6, 1987

[54] VIDEO SIGNAL PROCESSING APPARATUS FOR PROCESSING VIDEO SIGNALS AT THE TIME OF A SPECIAL REPRODUCTION MODE

[75] Inventors: Kohei Sasamura, Sagamihara; Junsuke Tokumitsu, Yokohama, both of Japan

[73] Assignee: Victor Company of Japan, Ltd., Yokohama, Japan

[21] Appl. No.: 692,302

[22] Filed: Jan. 17, 1985

[30] Foreign Application Priority Data

Jan. 18, 1984 [JP] Japan .................................... 59-6488
Jan. 18, 1984 [JP] Japan .............................. 59-5090[U]
Feb. 27, 1984 [JP] Japan ............................ 59-27120[U]

[51] Int. Cl.$^4$ ......................... H04N 9/88; H04N 5/94
[52] U.S. Cl. .................................... 358/312; 358/314; 360/10.3; 360/38.1
[58] Field of Search ............... 358/312, 314, 336, 339, 358/340; 360/10.1, 10.3, 36.2, 38.1

[56] References Cited

U.S. PATENT DOCUMENTS

| | | | |
|---|---|---|---|
| 3,586,762 | 6/1971 | Hodge et al. | 358/314 |
| 4,054,903 | 10/1977 | Ninomiya | 358/314 |
| 4,199,780 | 4/1980 | Taylor | 358/314 |
| 4,376,290 | 3/1983 | Shirota | 358/314 |

OTHER PUBLICATIONS

Azuma et al., "Microprocessor Controlled Variable Play-Back Speed System for Video Tape Recorder", IEEE Trans. Consum. Electron. (USA), vol. CE-26, No. 1 (Feb. 1980), pp. 121-128.

Primary Examiner—Donald McElheny, Jr.
Attorney, Agent, or Firm—Michael N. Meller

[57] ABSTRACT

A video signal processing apparatus for processing a video signal at the time of a special reproduction mode comprises an A/D converter for converting a reproduced video signal obtained by demodulating a frequency modulated signal reproduced from a recording medium during the special reproduction mode into a first digital video signal, a memory having a memory capacity for at least storing the first digital video signal corresponding to one field, a switching circuit for selectively producing the first digital video signal or a second digital video signal read out from the memory, a first circuit for at least generating a first pulse signal having a pulse width corresponding to a predetermined time period and a second pulse signal which determines the read-out timing of the memory, a second circuit for generating a control signal based on the first and second pulse signals for controlling read-out from the memory and causing the switching circuit to selectively produce the second digital video signal during a time period approximately corresponding to the predetermined time period, and a D/A converter for obtaining a reproduced composite video signal from the output digital video signal of the switching circuit.

7 Claims, 43 Drawing Figures

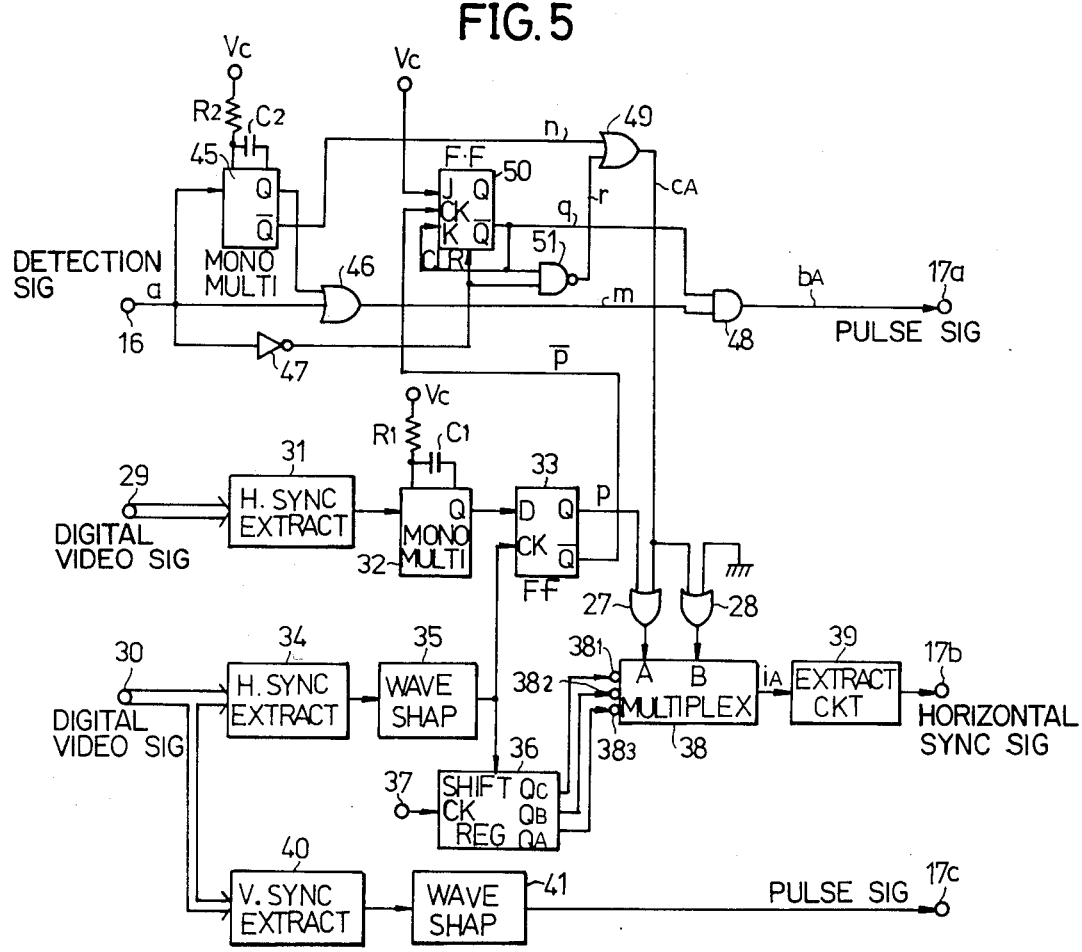

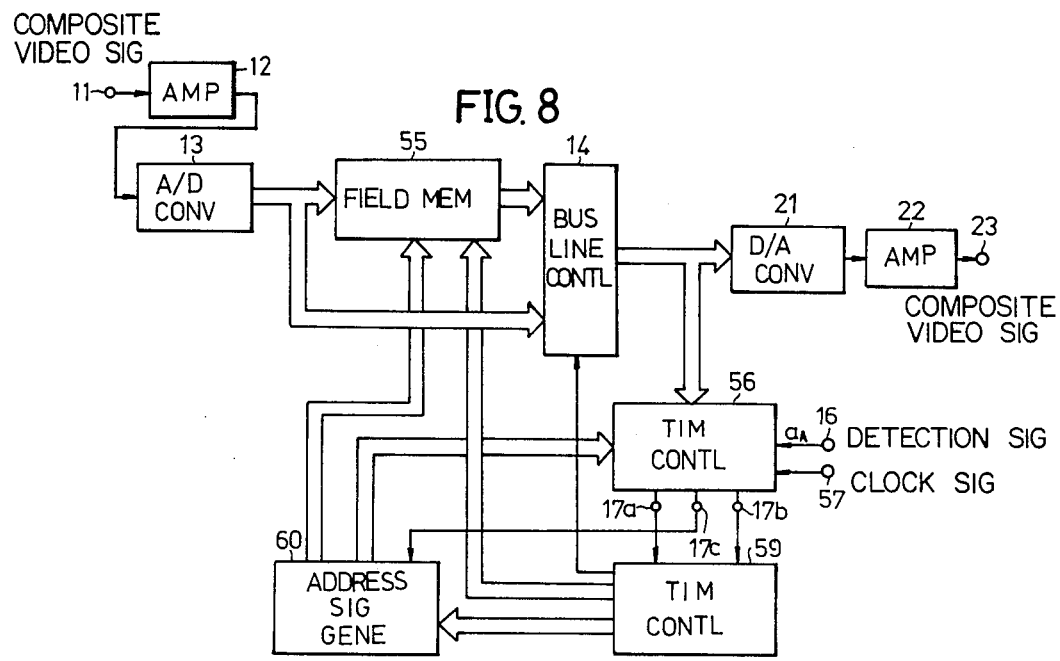
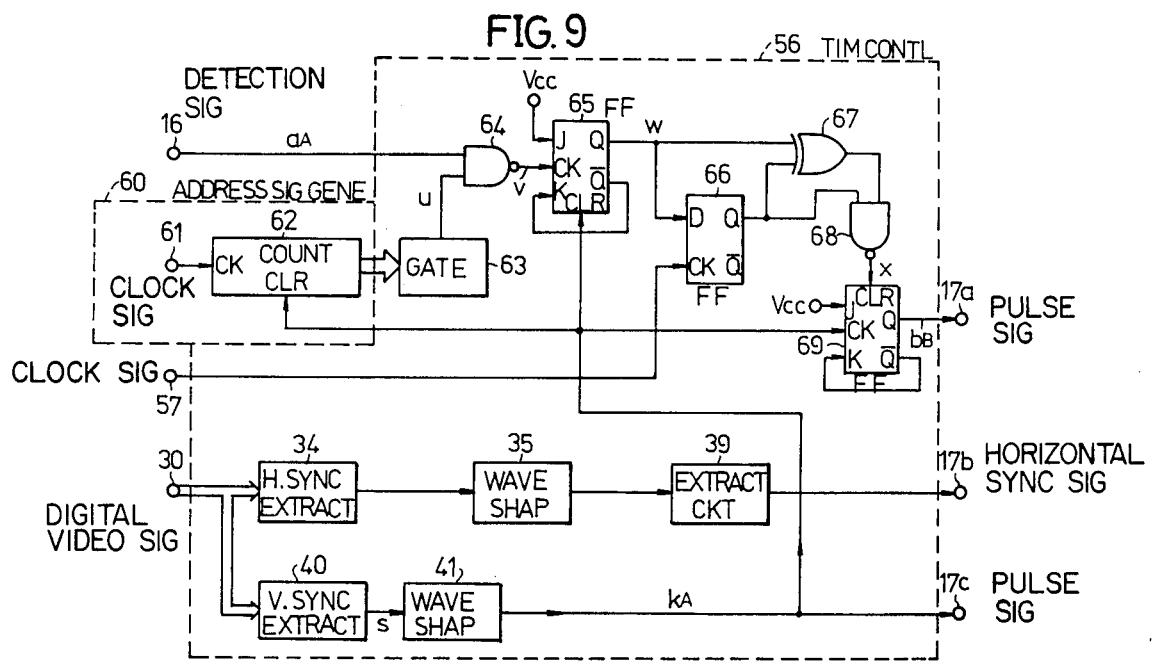

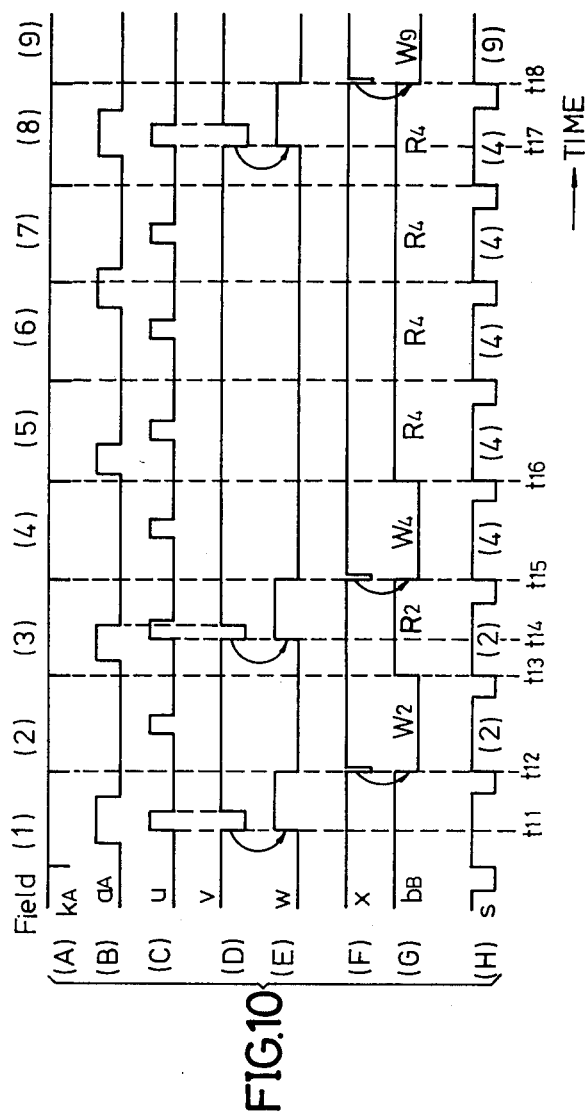

VIDEO SIGNAL PROCESSING APPARATUS FOR PROCESSING VIDEO SIGNALS AT THE TIME OF A SPECIAL REPRODUCTION MODE

BACKGROUND OF THE INVENTION

The present invention relates generally to video signal processing apparatuses for processing video signals at the time of a special reproduction mode, and more particularly to a video signal processing apparatus which carries out a digital signal processing to compensate for a deterioration in the signal-to-noise (S/N) ratio of a reproduced video signal that occurs when a reproducing element traverses one track from another track during a special reproduction mode of a recording and reproducing apparatus such as a helical scan type video tape recorder (VTR), which special reproduction mode is a mode in which recorded signals are reproduced from a pre-recorded recording medium by moving the recording medium at a such speed that a relative speed between the reproducing element and the recording medium is different from the relative speed at the time of the recording or by stopping the recording medium.

As is well known, a helical scan type VTR may assume a special reproduction mode in which recorded signals are reproduced from a pre-recorded magnetic tape at a speed which is different from the speed with which the magnetic tape is moved at the time of the recording or by stopping the magnetic tape. During such a special reproduction mode, a relative speed between the magnetic tape and a head differs from the relative speed at the time of the recording, and thus, the slope of a scanning locus of the head becomes different from the slope of the pre-recorded track formed on the magnetic tape. For this reason, when the special reproduction is carried out with respect to a pre-recorded magnetic tape having such a track pattern that two mutually adjacent tracks are formed by rotary heads having gaps of mutually different azimuth angles and no guard band or only an extremely narrow guard band is formed between the two mutually adjacent tracks, a reproducing rotary head which is carrying out the reproduction during one track scanning period alternately traverses a pre-recorded track formed by a rotary head having a gap of the same azimuth angle as that of the reproducing rotary head and a pre-recorded track (reverse track) formed by a rotary head having a gap of an azimuth angle different from that of the reproducing rotary head. When the reproducing rotary head scans over the reverse track, the level of the reproduced signal greatly decreases due to the azimuth loss effect, and the S/N ratio of the reproduced signal becomes deteriorated.

Similarly, during a special reproduction mode of a helical scan type VTR which does not employ the azimuth recording system, a reproducing rotary head scans over a pre-recorded magnetic tape having such a track pattern that a sufficiently wide guard band is formed between two mutually adjacent tracks, and the reproducing rotary head traverses the guard band one or more times during one track scanning period. Hence, the level of the reproduced signal greatly decreases when the reproducing rotary head scans over the guard band, and the S/N ratio of the reproduced signal becomes deteriorated.

In a case where the special reproduction mode is a frame advance mode in which a still picture is successively obtained from arbitrary tracks on the pre-recorded magnetic tape, it is necessary to carry out an accurate servo operation with respect to the tape moving mechanism so that noise appears outside the effective reproduced picture, in addition to taking measures to compensate for the deterioration in the S/N ratio of the reproduced signal. However, it is difficult to take such measures so that the noise appears completely outside the effective reproduced picture, and there is a problem in that some noise inevitably appears within the effective reproduced picture.

SUMMARY OF THE INVENTION

Accordingly, it is a general object of the present invention to provide a novel and useful video signal processing apparatus for processing a video signal at the time of a special reproduction mode, in which the problems described heretofore are eliminated.

Another and more specific object of the present invention is to provide a video signal processing apparatus comprising an analog-to-digital (A/D) converter, a memory, switching means, write-in control means, read-out control means, and output means. The A/D converter converts a composite video signal obtained from a frequency modulated (FM) signal reproduced from a recording medium moving at such a speed that a relative speed between a reproducing element and the recording medium is different from that at the time of the recording or from a stationary recording medium into a digital video signal. The memory has a memory capacity of over one field. The switching means selectively produces one of the output signal of the A/D converter and a signal read out from the memory. During a predetermined time period made up of a time period in which the envelope level of the reproduced FM signal is smaller than a predetermined level and constant time periods in vicinities thereof, the write-in control means controls the switching means to selectively produce instead of the output signal of the A/D converter a digital video signal read out from the memory, which digital video signal is related to a time period which is one track scanning period before the predetermined time period and corresponds to the predetermined time period. On the other hand, during time periods other than the predetermined time period, the write-in control means controls the switching means to selectively produce the output signal of the A/D converter and writes the output signal of the A/D converter into the memory. The read-out control means detects a relative phase lead or phase lag between the phases of synchronizing signals within output signals of the switching means and the A/D converter during the above constant time periods and controls the read-out timing of the memory so that the phase difference between the synchronizing signals is reduced. The output means obtains a reproduced composite video signal from the output signal of the switching means.

According to the video signal processing apparatus of the present invention, when the envelope level of the reproduced FM signal in the predetermined time period is smaller than the predetermined level during the special reproduction mode, the digital video signal related to the time period which is one track scanning period before the predetermined time period and corresponds to the predetermined time period is read out from the memory and replaces the reproduced composite video signal. As a result, it is possible to obtain a reproduced composite video having no deterioration in the S/N ratio and hence obtain a reproduced picture of a high picture quality. In addition, at a point near the end of a read-out from the memory, the relative phase lead or phase lag between the horizontal synchronizing pulses within the signal read out from the memory and the horizontal synchronizing pulses within the reproduced composite video signal are detected and the read-out timing is controlled so that the phase difference between the horizontal synchronizing pulses within the signal read out from the memory and the horizontal synchronizing pulses within the reproduced composite video signal is reduced. For this reason, it is possible to reproduce the digital video signal stored in the memory with a high fidelity. Further, the read-out from the memory can be ended at a point when the timing of the horizontal synchronizing pulses within the digital video signal read out from the memory and the horizontal synchronizing pulses within the reproduced composite video signal approximately coincide. On the other hand, the timings with which the write-in and read-out operations are carried out with respect to the memory are synchronized to the chrominance subcarrier frequency. Accordingly, when replacing the reproduced composite video signal within the predetermined time period by the video signal related to the time period which is one track scanning period before the predetermined time period and corresponds to the predetermined time period, the continuity of the phase of the chrominance subcarrier will not be disturbed. Thus, the signals will connect smoothly at parts where the replacement of the video signal take place, and it is possible to greatly improve the picture quality of the reproduced picture.

Still another object of the present invention is to provide a video signal processing apparatus in which the read-out control means described before is designed so as to end the read-out operation with respect to the memory when the phase difference between the horizontal synchronizing pulses within the signal read out from the memory and the horizontal synchronizing pulses within the reproduced composite video signal approximately coincide, even during the constant time periods described before.

According to the video signal processing apparatus of the present invention, the adjustment of the read-out timing is ended when the phase difference between the horizontal synchronizing pulses within the signal read out from the memory and the horizontal synchronizing pulses within the reproduced composite video signal approximately coincide, even during a predetermined time setting period in which the read-out timing may be set, so that the switching means switches back and produces the reproduced composite video signal. As a result, it is possible to reduce the time required to adjust the read-out timing and also reduce the read-out time period. The present invention is especially effective in a case where the envelope level of the reproduced FM signal frequently decreases within one field (one track scanning period). In addition, since the read-out time period is reduced, it is possible to obtain more reproduced picture information.

A further object of the present invention is to provide a video signal processing apparatus in which a discrimination is carried out to determine whether a detection signal exists, which detection signal indicates a reproducing time period in which the envelope level of the reproduced FM signal during a frame advance mode is smaller than a predetermined level. When it is discriminated that the detection signal exists, a digital video signal related to a subsequent one field period is written into the memory. On the other hand, when it is discriminated that the detection signal does not exist, a digital video signal is read out from the memory.

According to the video signal processing apparatus of the present invention, it is possible to write into the memory only a digital video signal having no deterioration in the S/N ratio, because the envelope level of the reproduced FM signal is constantly over the predetermined level and accompanies no deterioration in the S/N ratio during the subsequent one field period when it is discriminated that the detection signal exists. During other field periods in which a reproduced composite color video signal accompanying a deterioration in the S/N ratio may be obtained, it is possible to obtain the signal read out from the memory for a required number of times. As a result, it is possible to automatically obtain a frame advance picture having no deterioration in the S/N ratio. Moreover, it is unnecessary to provide an extremely high precision servo circuit to carry out the frame advance reproduction, and it is sufficient to provide a single memory having a memory capacity of at least one field. Therefore, the video signal processing apparatus can be manufactured at a low cost.

Other objects and further features of the present invention will be apparent from the following detailed description when read in conjunction with the accompanying drawings.

BRIEF DESCRIPTION OF THE DRAWINGS

FIG. 5 is a systematic circuit diagram showing a second embodiment of the first timing control circuit within the block system shown in FIG. 1;

FIG. 8 is a systematic block diagram showing a second embodiment of the video signal processing circuit according to the present invention;

FIG. 9 is a systematic circuit diagram showing an embodiment of an essential part of the block system shown in FIG. 8; and FIGS. 10(A) through 10(H) show signal waveforms for explaining the operation of the circuit system shown in FIG. 9.

DETAILED DESCRIPTION

Figure 1:
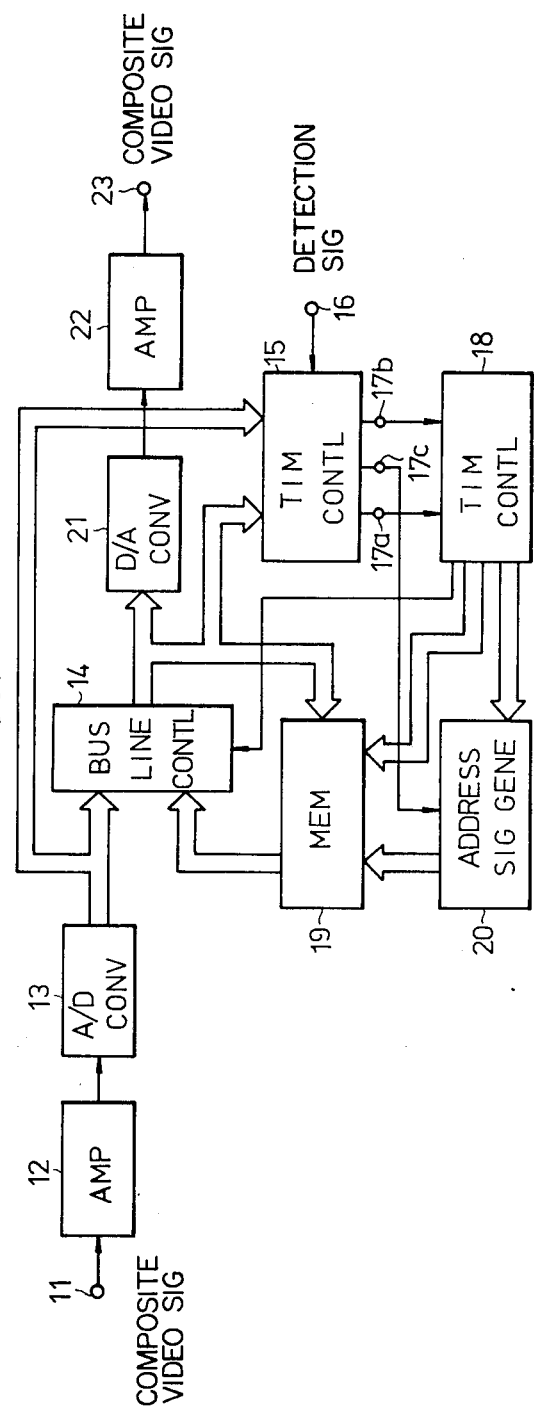
FIG. 1 is a systematic block diagram showing a first embodiment of a video signal processing apparatus according to the present invention.

In FIG. 1, a reproduced composite color video signal is applied to an input terminal 11. At the time of the recording, a luminance signal is frequency-modulated and a carrier chrominance signal is frequency-converted into a low-frequency band, and a time division multiplexed signal in which the frequency modulated luminance signal and the frequency converted carrier chrominance signal are time-division-multiplexed is successively recorded on tracks of a recording medium such as a magnetic tape (hereinafter simply referred to as a tape) at a rate of one field per track. During a special reproduction mode, the frequency modulated luminance signal within the signal reproduced from the tape is frequency-demodulated and the frequency converted carrier chrominance signal within the signal reproduced from the tape is frequency-converted back into the original frequency band. The reproduced luminance signal and the reproduced carrier chrominance signal are multiplexed so as to obtain the above reproduced composite color video signal which is approximately in conformance with the standard television system. In a case where such a special reproduction is applied to a VTR employing the azimuth recording and reproducing system, the tape is moved at such a speed that the tape moves by an even number of track pitches during one track scanning period (one field period) or is stopped. By moving the tape in this manner, although one rotary head scans over a reverse track during a pedetermined time period, a reproduced signal would have been obtained in a normal manner from another rotary head during a time period which is one track scanning period before the predetermined time period and corresponds to the predetermined time period.

The reproduced composite color video signal (hereinafter simply referred to as a reproduced composite video signal) applied to the input terminal 11 is supplied to an analog-to-digital (A/D) converter 13 through an amplifier 12. The reproduced composite video signal is converted into a digital video signal in the A/D converter 13, and the digital video signal is supplied to a bus line controller 14 and to a first timing control circuit 15. As will be described later on in the specification, the first timing control circuit 15 is supplied with both input and output digital video signals of the bus line controller 14 and a detection signal from an input terminal 16. For example, the detection signal is a binary signal which assumes a high level during a time period in which the amplitude of the frequency modulated luminance signal reproduced by a rotary head scanning over the tape becomes lower than a predetermined value, amnd assumes a low level during a time period in which the amplitude of the reproduced frequency modulated luminance signal is greater than or equal to the predetermined value. For example, the detection signal can be produced from a circuit comprising a detecting circuit for detecting the envelope of the reproduced frequency modulated luminance signal and a comparator for comparing the levels of an output signal of the detecting circuit with a reference signal having a level corresponding to the predetermined value and for producing the detection signal.

When a reproducing rotary head scans over a reverse track which is formed by a rotary head having gaps of an azimuth different from that of the reproducing rotary head, the envelope level of the reproduced frequency modulated luminance signal becomes lower than the predetermined value. For this reason, the detection signal described before assumes a high level.

The first timing control circuit 15 produces a pulse signal through an output terminal 17a in phase synchronism with the detection signal, and supplies this pulse signal to a second timing control circuit 18.

In addition, the first timing control circuit 15 produces through an output terminal 17b horizontal synchronizing pulses which are obtained by eliminating equalizing pulses and vertical synchronizing pulses from the digital video signal. The horizontal synchronizing pulses are supplied to the second timing control circuit 18. Further, the first timing control circuit 15 also produces through an output terminal 17c a pulse signal which is obtained by wave-shaping the vertical synchronizing pulses. This pulse signal from the output terminal 17c is supplied to an address signal generating circuit 20. The second timing control circuit 18 generates a signal in synchronism with the chrominance subcarrier frequency based on the pulse signal from the output terminal 17a, and supplies the generated signal to the bus line controller 14 so as to control the switching thereof. Based on the pulse signal from the output terminal 17a, the second timing control circuit 18 also generates a column address strobe (CAS) signal, a row address strobe (RAS) signal, a read/write control signal (write enable signal or simply WE signal) and the like which are required for the write-in and read-out operations to be carried out with respect to a memory 19. The CAS signal, the RAS signal, the WE signal and the like are supplied to the memory 19. Further, the second timing control circuit 18 supplies another signal to the address signal generating circuit 20. The address signal generating circuit 20 generates an address signal and supplies the address signal to the memory 19. For example, the memory 19 is a random access memory (RAM) having a memory capacity for storing a digital video signal corresponding to one field. In other words, the memory 19 is a field memory. A digital video signal read out from the memory 19 is supplied to the bus line controller 14, and a digital video signal obtained from the bus line controller 14 is written into the memory 19.

The digital video signal which is selectively produced from the bus line controller 14 is supplied to the first timing control circuit 15, the memory 19, and a digital-to-analog (D/A) converter 21. The D/A converter 21 returns the digital video signal into the composite video signal which is an analog signal, and the output composite video signal of the D/A converter 21 is supplied to an output terminal 23 through an amplifier 22. Normally, the memory 19 writes therein the output digital video signal of the A/D converter 13 supplied to the memory 19 through the bus line controller 14. However, when the rotary head scans over the reverse track during the special reproduction mode, the detection signal applied to the input terminal 16 assumes a high level at least during a predetermined time period including the time period in which the rotary head scans over the reverse track as described before. As a result, the read-out with respect to the memory 19 is controlled based on the output signals of the timing control circuits 15 and 18. Further, the bus line controller 14 selectively produces the reproduced digital video signal read out from the memory 19, which reproduced digital video signal is related to a time period which is one track scanning period before the predetermined time period and corresponds to the predetermined time period. Accordingly, although the reproduced composite video signal produced through the output terminal 23 is normally the reproduced composite video signal reproduced from the rotary head scanning over the tape, the reproduced composite video signal related to a certain field and reproduced by the rotary head scanning over the reverse track is replaced by the digital video signal read out from the memory 19 which digital video signal is related to a different field which is one track scanning period before the certain field. In other words, the reproduced composite video signal related to a certain odd field (even field) and reproduced by the rotary head scanning over the reverse track is replaced by the digital video signal read out from the memory 19 which digital video signal is related to an even field (odd field) which is one track scanning period before the certain odd field (even field). Therefore, it is possible to prevent the S/N ratio of the reproduced composite video signal from becoming deteriorated.

Figure 2:
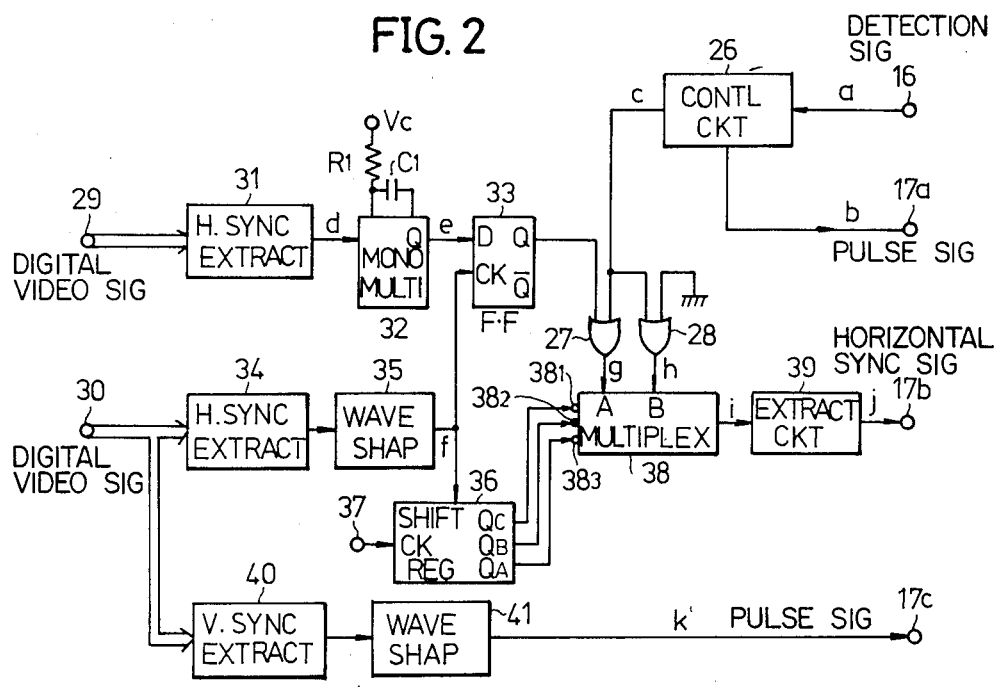
FIG. 2 is a systematic circuit diagram showing a first embodiment of a first timing control circuit within the block system shown in FIG. 1.

According to the present invention, the read-out timing of the memory 19 is controlled so that the digital video signal being reproduced and the digital video signal read out from the memory 19 connect in a stable manner. Description will now be given with respect to such a control of the read-out timing. FIG. 2 is a systematic circuit diagram showing a first embodiment of the first timing control circuit 15 shown in FIG. 1. In FIG. 2, those parts which are the same as those corresponding parts in FIG. 1 are designated by the same reference numerals, and their description will be omitted. In FIG. 2, a detection signal a shown in FIG. 3(A) having a high-level period in correspondence with the time period in which the reverse track is scanned by the reproducing rotary head, is supplied to a control circuit 26 through the input terminal 16. The control circuit 26 converts the detection signal a into a pulse signal b shown in FIG. 3(B) which assumes a high level from a time $t_0$ when the detection signal a rises up to a time $t_2$ which is a predetermined time after the detection signal a falls at a time $t_1$. The pulse signal b is produced through the output terminal 17a. On the other hand, the control circuit 26 converts the detection signal a into a pulse signal c shown in FIG. 3(C) which assumes a low level from the time $t_1$ up to the time $t_2$. The pulse signal c is supplied to one input terminal of a 2-input OR circuit 27 and to one input terminal of a 2-input OR circuit 28 which will be described later. A low-level signal is constantly supplied to the other input terminal of the OR circuit 28.

Figure 3:
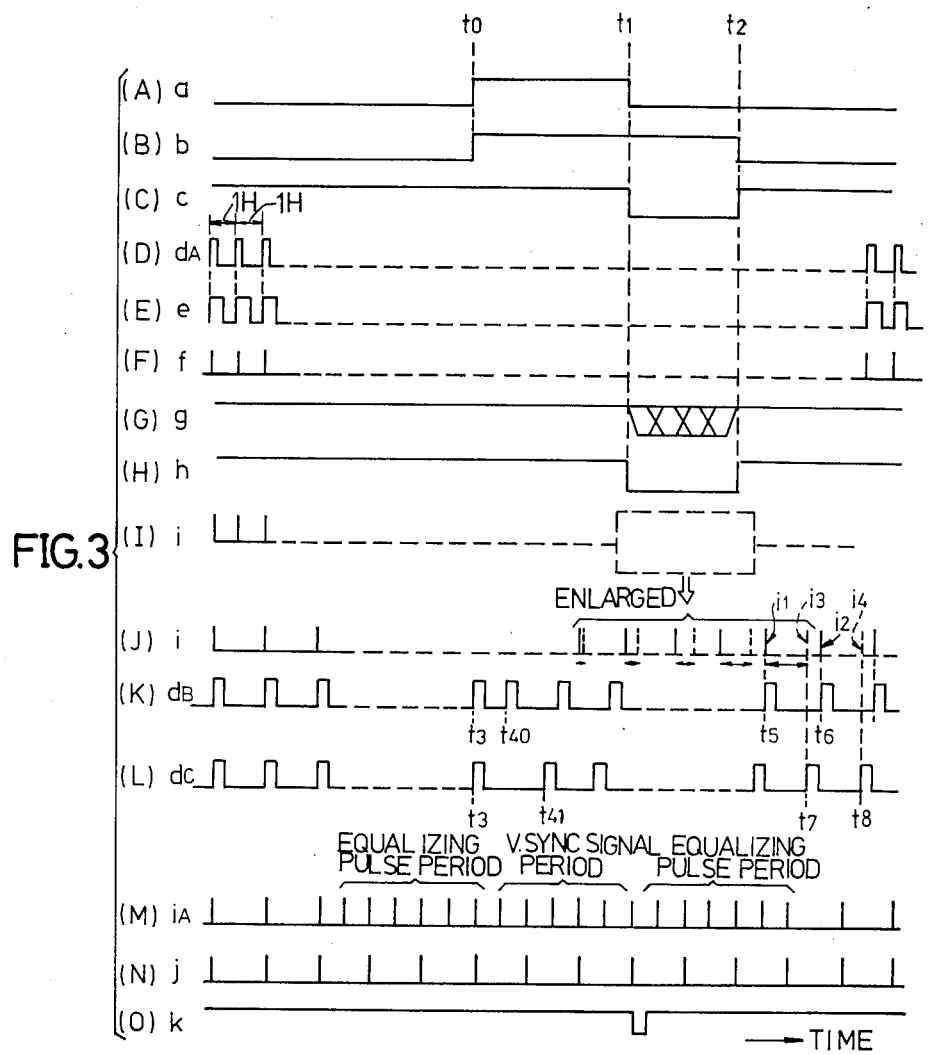
FIGS. 3(A) through 3(O) show signal waveforms for explaining the operation of the circuit system shown in FIG. 2.

On the other hand, the output digital video signal of the A/D converter 13 is applied to an input terminal 29, and the digital video signal selectively produced from the bus line controller 14 is applied to an input terminal 30. The digital video signal applied to the input terminal 29 is supplied to a horizontal synchronizing pulse extracting circuit 31 wherein horizontal synchronizing pulses $d_A$ shown in FIG. 3(D) are extracted. The horizontal synchronizing pulses $d_A$ has a period of one horizontal scanning period (1H). The output horizontal synchronizing pulses $d_A$ of the extracting circuit 31 are supplied to a monostable multivibrator 32 and triggers the monostable multivibrator 32 by rising edges thereof. The time constant of the monostable multivibrator 32 is determined by the resistance of a resistor $R_1$ and the capacitance of a capacitor $C_1$, and is set approximately equal to 31 μsec which is approximately equal to H/2. Accordingly, a pulse signal e shown in FIG. 3(E) is produced through a Q-output terminal of the monostable multivibrator 32, and this pulse signal e is applied to a data input terminal D of a D-type flip-flop 33.

The digital video signal applied to the input terminal 30 is supplied to a horizontal synchronizing pulse extracting circuit 34 and to a vertical synchronizing pulse extracting circuit 40 which will be described later. The horizontal synchronizing pulses obtained from the extracting circuit 34 are supplied to a wave shaping circuit 35 which extracts rising edges of the horizontal synchronizing pulses and converts the horizontal synchronizing pulses into a pulse signal f shown in FIG. 3(F). The pulse signal f is applied to a clock input terminal of the flip-flop 33 as clock pulses, and is also supplied to a shift register 36. The shift register 36 successively shifts the pulse signal f responsive to shift pulses from an input terminal 37, and successively produces the shifted pulse signal f through output terminals $Q_A$, $Q_B$, and $Q_C$. The signals produced from the output terminals $Q_A$, $Q_B$, and $Q_C$ are supplied to corresponding input terminals $38_3$, $38_2$, and $38_1$ of a multiplexer 38. The flip-flop 33 produces through the Q-output terminal thereof a signal obtained by sampling and holding the pulse signal e for every incoming pulse of the pulse signal f. However, during a time period corresponding to the high-level period of the pulse signal b shown in FIG. 3(B) between the times $t_0$ and $t_2$, the digital video signal read out from the memory 19 is applied to the input terminal 30. For this reason, during this time period corresponding to the high-level period of the pulse signal b, the signal produced through the Q-output terminal of the flip-flop 33 has a level in correspondence with the phase lead or phase lag between the phase of the reproduced horizontal synchronizing pulses obtained from the rotary head scanning over the tape and the phase of the reproduced horizontal synchronizing pulses of one track scanning period before and read out from the memory 19. The signal produced through the Q-output terminal of the flip-flop 33 is supplied to the other input terminal of the OR circuit 27. The OR circuit 27 obtains a logical sum of the signal from the Q-output terminal and the pulse signal c and produces a signal g shown in FIG. 3(G).

The multiplexer 38 selectively produces one of the input signals applied to the input terminals $38_1$ through $38_3$ depending on the input signals applied to control input terminals A and B. The following table shows the relationships among the levels of the pulse signals g and h which are applied to the control input terminals A and B from the OR circuits 27 and 28 and the input terminal which is applied with the signal selectively passed by the multiplexer 38, where H and L respectively represent high and low levels.

TABLE

| g (A) | h (B) | Input terminal applied with the signal passed by the multiplexer 38 |
|---|---|---|
| L | L | $38_1$ |
| H | H | $38_2$ |
| H | L | $38_3$ |

The pulse signal g applied to the control input terminal A of the multiplexer 38 is the pulse signal which is obtained by taking the logical sum of the pulse signal c and the Q-output signal of the flip-flop 33 in the OR circuit 27. Since the pulse signal c normally assumes a high level, the output pulse signal g of the OR circuit 27 normally assumes a high level. However, during a low-level period of the pulse signal c between the times $t_1$ and $t_2$ shown in FIG. 3(C), the level of the pulse signal g is determined by the level of the Q-output of the flip-flop 33 and the level of the pulse signal g is unstable as shown in FIG. 3(G). For example, during the predetermined time period between the times $t_1$ and $t_2$, the Q-output signal of the flip-flop 33 assumes a low level when the pulse signal e lags in time with respect to the pulse signal f, and thus, the pulse g also assumes a low level. On the other hand, since the pulse signal h applied to the control input terminal B of the multiplexer 38 is obtained by taking the logical sum of the pulse signal c and the low-level signal in the OR circuit 28, the pulse signal h is identical to the pulse signal c as may be seen by comparing FIGS. 3(C) and 3(H).

After the reproducing rotary head scans over the reverse track during the special reproduction mode, the reproducing rotary head thereafter starts to scan over the pre-recorded track which is formed by a rotary head having a gap of the same azimuth angle as the reproducing rotary head at the time $t_1$. Accordingly, during time periods other than the predetermined time period between the times $t_1$ and $t_2$, both the pulse signals g and h assumes a high level and the multiplexer 38 produces the pulse signal applied to the input terminal $38_2$ thereof. On the other hand, during the above predetermined time period between the times $t_1$ and $t_2$, the pulse signal h assumes a low level and the pulse signal g assumes a low level when the phase of the pulse signal e lags the phase of the pulse signal f. Hence, when the phase of the pulse signal e lags the phase of the pulse signal f during the predetermined time period between the times $t_1$ and $t_2$, the multiplexer 38 produces the pulse signal applied to the input terminal $38_1$ thereof. On the other hand, when the phase of the pulse signal e leads the phase of the pulse signal f during the predetermined time period between the times $t_1$ and $t_2$, the pulse signal g assumes a high level and the multiplexer 38 produces the pulse signal applied to the input terminal $38_3$ thereof. The phase of the pulse signal applied to the input terminal $38_1$ lags the phase of the pulse signal applied to the input terminal $38_2$ by one period of the shift pulses applied to the shift register 36. The phase of the pulse signal applied to the input terminal $38_3$ leads the phase of the pulse signal applied to the input terminal $38_2$ by one period of the above shift pulses.

The read-out from the memory 19 is controlled during the high-level period of the pulse signal b, that is, during the time period between the times $t_0$ and $t_2$. Further, the bus line controller 14 selectively produces the signal read out from the memory 19 during this time period between the times $t_0$ and $t_2$. The pulse signal f obtained during this time period is in phase synchronism with the rising edge of the horizontal synchronizing pulses within the digital video signal which is related to one track scanning period before and does not contain a signal deterioration. As a result, a pulse signal i shown in FIG. 3(I) is produced from the multiplexer 38. FIG. 3(J) shows the pulse signal i shown in FIG. 3(I) with the time base enlarged.

It will now be assumed that in the digital video signal which is applied to the input terminal 29 from the A/D converter 13 and is related to the signal obtained from the reproducing rotary head between the times $t_0$ and $t_2$, the interval between two adjacent horizontal synchronizing pulses becomes shorter due to causes such as the scanning of the reverse track, and the time period between times $t_3$ (corresponding to the time $t_1$ described before) and $t_{40}$ of an output pulse signal $d_B$ of the extracting circuit 31 becomes shorter by five periods of the chrominance subcarrier having a frequency $f_s$, for example. In this case, the phase of the digital video carrier signal which is obtained from the memory 19 and is applied to the input terminal 30 through the bus line controller 14, leads the phase of the digital video signal applied to the input terminal 29 which is obtained by subjecting the video signal reproduced by the reproducing rotary head to the analog-to-digital conversion in the A/D converter 13, by five periods of the chrominance subcarrier. However, as described before, the pulse signal g assumes a high level and the pulse signal h assumes a low level during the time period between the times $t_1$ and $t_2$, and the multiplexer 38 selectively produces during this time period the pulse signal which is applied to the input terminal $38_3$ from the output terminal $Q_A$ of the shift register 36. As a result, the read-out timing of the memory 19 is advanced. In other words, by selecting the shift pulses applied to the input terminal 37 to pulses which have a repetition frequency equal to the chrominance subcarrier frequency $f_s$ and is obtained from an oscillator (not shown), for example, the phase of the first pulse in the output pulse signal i of the multiplexer 38 immediately after the time $t_1$ advances by one period of the chrominance subcarrier as indicated by a solid line in FIG. 3(J). The phase of the second pulse in the output pulse signal i of the multiplexer 38 after the time $t_1$ also advances by one period of the chrominance subcarrier. Similarly, the phase of the third and subsequent pulses in the output pulse signal i of the multiplexer 38 successively advance by one period of the chrominance subcarrier. At the time $t_2$ (corresponding to a time $t_5$ shown in FIG. 3(K)) when the read-out from the memory 19 is ended, a pulse $i_1$ of the pulse signal i shown in FIG. 3(J) the phase of which is advanced by five periods of the chrominance subcarrier is obtained from the multiplexer 38.

A pulse $i_2$ of the pulse signal i shown in FIG. 3(J) is first obtained from the multiplexer 38 after the time $t_2$ ($t_5$). As indicated by a solid line in FIG. 3(J), the pulse $i_2$ is in phase synchronism with the rising edge of a horizontal synchronizing pulse $d_B$ shown in FIG. 3(K). The interval of the horizontal synchronizing pulses between the times $t_5$ and $t_6$ is approximately equal to 1H. This means that the horizontal synchronizing pulses will connect stably and will be continuous even when the output of the bus line controller 14 is switched from the output of the memory 19 to the output of the A/D converter 13.

On the other hand, in a case where the interval of the output horizontal synchronizing pulses $d_C$ of the extracting circuit 31 becomes longer than 1H between the times $t_3$ (corresponding to the time $t_1$) and $t_{41}$ as shown in FIG. 3(L), the multiplexer 38 selectively produces the pulse signal applied to the input terminal $38_1$. At the time $t_2$ (corresponding to a time $t_7$ shown in FIG. 3(L)) when the read-out from the memory 19 is ended, the phase of the pulse signal i lags by five periods of the chrominance subcarrier, and the multiplexer 38 produces a pulse $i_3$ indicated by a phantom line in FIG. 3(J) which is approximately in phase with the rise in the horizontal synchronizing pulse within the video signal which is being reproduced. At a time $t_8$, a pulse signal $i_4$ indicated by a phantom line in FIG. 3(J) is produced from the multiplexer 38 based on the horizontal synchronizing pulses being reproduced, although the read-out time period is ended before the time $t_8$.

The phase of the pulse signal obtained from the output terminal $Q_B$ of the shift register 36 is used as a reference phase. Hence, while the digital video signal being reproduced is written into the memory 19, the phase of the pulse signal i which determines the address is in synchronism with the reference phase and the read-out timing of the memory 19 is not adjusted. On the other hand, during a time period corresponding to the high-level period of the pulse signal b such as the time period between the times $t_0$ and $t_2$, the read-out timing of the memory 19 is controlled. The first timing control circuit 15 controls the read-out timing of the memory 19 by discriminating only during the low-level period of the pulse signal c between the times $t_1$ and $t_2$ the phase lead or phase lag between the phase of the horizontal synchronizing pulses within the digital video signal being reproduced and the phase of the reproduced horizontal synchronizing pulses which are related to one track scanning period before and are read out from the memory 19, so as to determine the phase the pulse signal i.

In a case where a time deviation (a time interval of one field) occurs between the reproduced horizontal synchronizing pulses before and after the one track scanning period depending on the type of VTR, for example, the timing adjusting time period between the times $t_1$ and $t_2$ may be set according to the time deviation.

The output pulse signal i of the multiplexer 38 is in synchronism with the vertical synchronizing pulses and the equalizing phase having an interval of 0.5H during the vertical blanking period as indicated by a pulse signal $i_4$ shown in FIG. 3(M) which shows the waveform of the pulse signal i during the vertical blanking period. The pulse signal i is supplied to an equalizing pulse and vertical synchronizing pulse extracting circuit 39 which eliminates the equalizing pulses and the vertical synchronizing pulses from the pulse signal i and obtains a pulse signal (timing signal) j shown in FIG. 3(N). The timing signal j has an interval of 1H and is produced through the output terminal 17b. On the other hand, the vertical synchronizing pulses extracted in the extracting circuit 40 are subjected to a wave-shaping in a wave shaping circuit 41 and is formed into a pulse signal k shown in FIG. 3(O). The pulse signal k is produced through the output terminal 17c. In FIGS. 3(J) through 3(O), the time base is shown in an enlarged scale compared to the time base in FIGS. 3(A) through 3(I). It is unnecessary to provide the extracting circuit 39 in a case where the horizontal synchronizing pulse extracting circuits 31 and 34 also have the function of extracting circuit 39.

The timing signal j obtained from the output terminal 17b is supplied to the second timing control circuit 18 shown in FIG. 1. The second timing control circuit 18 is supplied with the timing signal j shown in FIG. 4(B) from the output terminal 17b and clock pulses shown in FIG. 4(A) which have a repetition frequency equal to the chrominance subcarrier frequency $f_s$ and are obtained by subjecting the shifting pulses applied to the input terminal 37 to a wave-shaping, and produces a signal l shown in FIG. 4(C) based on the timing signal j and the clock pulses. The signal l rises in phase synchronism with the rising edges of the clock pulses. The second timing control circuit 18 controls the write-in and read-out to and from the memory 19, controls the address, and controls the bus line controller 14 based on the rising edges of the signal l. In other words, the second timing control circuit 18 comprises a D-type flip-flop having a clock input terminal applied with the signal l and a data input terminal applied with the pulse signal b, and a Q-output signal of this flip-flop is supplied to the memory 19 and to the bus line controller 14 as the WE signal described before. The read-out from the memory 19 is controlled and the bus line controller 14 is controlled so selectively produce the digital video signal read out from the memory 19 during the high-level period of the Q-output signal of the flip-flop within the second timing control circuit 18. On the other hand, during the low-level period of the Q-output signal of the flip-flop within the second timing control circuit 18, the write-in to the memory 19 is controlled and the bus line controller 14 is controlled so as to selectively produce the output digital video signal of the A/D converter 13.

Figure 4:
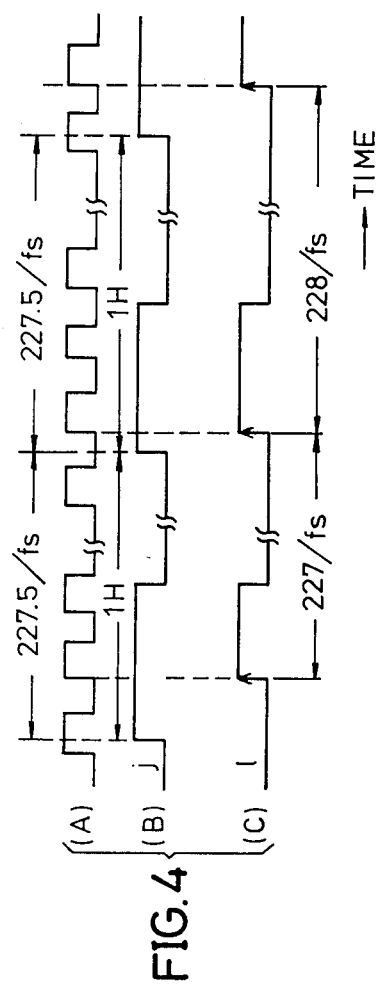
FIGS. 4(A) through 4(C) show signal waveforms for explaining the operation of a second timing control circuit within the block system shown in FIG. 1.

Because the chrominance subcarrier frequency $f_s$ is 227.5 times the horizontal scanning frequency $f_H$, the phase of the chrominance subcarrier is inverted for every 1H. However, since the signal l shown in FIG. 4(C) rises in phase synchronism with the rise in the clock pulses which have the repetition frequency $f_s$ and are shown in FIG. 4(A), the phase of the chrominance subcarrier and the phase of the rising edge of the signal l constantly satisfy the same relationship. Accordingly, it is possible to obtain an extremely stable connection between the read out signal and the signal being reproduced when the switching is performed between the read out signal and the signal being reproduced, because the phase of the chrominance subcarrier in the read out signal is approximately the same as the phase of the chrominance subcarrier in the signal being reproduced.

Although a detailed description will be omitted, the second timing control circuit 18 generates in addition to the CAS signal, the RAS signal, and the WE signal described before various control signals for controlling an address counter within the address signal generating circuit 20 such as a column counter clear signal, a row address counter clock signal, an address selecting signal and the like. The address counter within the address signal generating circuit 20 will be described later on in the specification.

Figure 7:
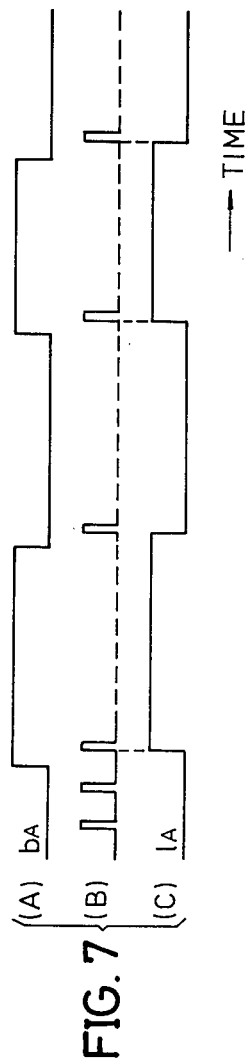
FIGS. 7(A) through 7(C) show signal waveforms for explaining another example of the operation of the second timing control circuit within the block system shown in FIG. 1.
Figure 6:
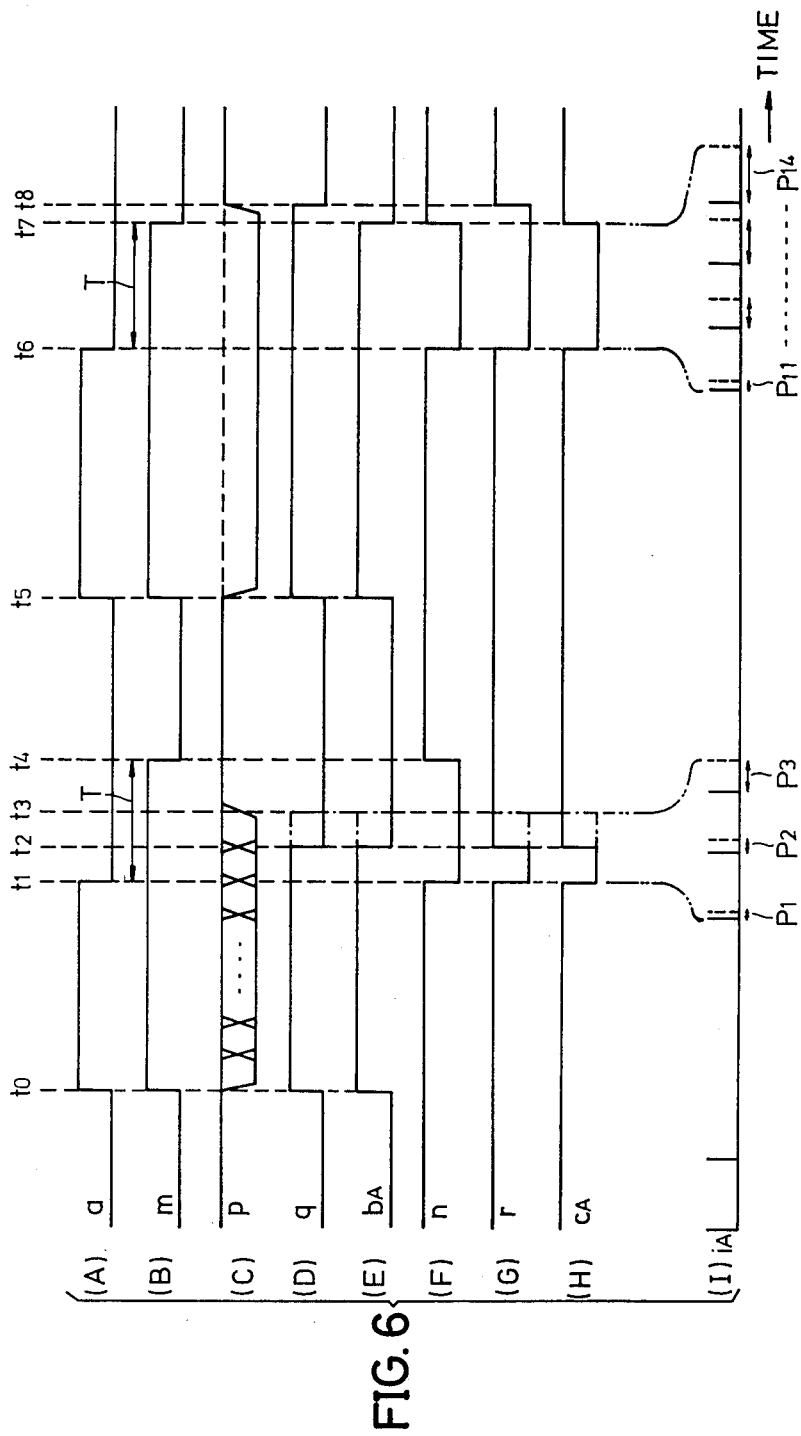
FIGS. 6(A) through 6(I) show signal waveforms for explaining the operation of the circuit system shown in FIG. 5.

Next, a description will be given with respect to a second embodiment of the first timing control circuit 15 by referring to FIGS. 5 through 7. In FIG. 5, those parts which are the same as those corresponding parts in FIG. 1 are designated by the same reference numerals, and their description will be omitted. In FIG. 5, a detection signal a shown in FIG. 6(A) having a high-level period in correspondence with the time period in which the reverse track is scanned, is applied to the input terminal 16. The detection signal a is supplied to a monostable multivibrator 45, one input terminal of a 2-input OR circuit 46, and an inverter 47. The monostable multivibrator 45 is triggered by the falling edge of the detection signal a, and produces a pulse signal having a constant pulse width T in accordance with the time constant which is determined by the resistance of a resistor $R_2$ and the capacitance of a capacitor $C_2$. Accordingly, in a case where the detection signal a assumes a high level between the times $t_0$ and $t_1$ and between the times $t_5$ and $t_6$ as shown in FIG. 6(A), a pulse signal which assumes a high level for a predetermined time T from the times $t_1$ and $t_6$, that is, a pulse signal which assumes a high level between the times $t_1$ and $t_4$ and between the times $t_6$ and $t_7$, is produced from a Q-output terminal of the monostable multivibrator 45. This pulse signal from the Q-output terminal of the monostable multivibrator 45 is supplied to the other input terminal of the OR circuit 46. Hence, a pulse signal m which assumes a high level between the times $t_0$ and $t_4$ and between the times $t_5$ and $t_7$ as shown in FIG. 6(B), is obtained from the OR circuit 46 and is applied to one input terminal of a 2-input AND circuit 48. In addition, a pulse signal n which assumes a low level between the times $t_1$ and $t_4$ and between the times $t_6$ and $t_7$ as shown in FIG. 6(F), is produced from a $\overline{Q}$-output terminal of the monostable multivibrator 45. The pulse signal n is applied to one input terminal of a 2-input OR circuit 49.

An output signal $\overline{a}$ of the inverter 47 which is obtained by inverting the detection signal a, is applied to a clear terminal CLR of a J-K flip-flop 50 and clears the flip-flop 50 during a low-level period of the signal $\overline{a}$. A positive D.C. voltage $V_c$ is applied to a terminal J of the flip-flop 50, and the $\overline{Q}$-output signal of the flip-flop 50 is applied to a terminal K. Further, a $\overline{Q}$-output signal of the flip-flop 33 is applied to a clock terminal CK of the flip-flop 50. A signal p shown in FIG. 6(C) is produced from the Q-output terminal of the flip-flop 33, and an inverted signal $\overline{p}$ is produced from the $\overline{Q}$-output terminal of the flip-flop 33.

Between the times $t_0$ and $t_1$ and between the times $t_5$ and $t_6$ in which a low-level signal is applied to the clear terminal CLR of the flip-flop 50, the flip-flop 50 is maintained in the cleared state regardless of the signal $\overline{p}$ applied to the clock terminal CK and a high-level signal is produced from the $\overline{Q}$-output terminal of the flip-flop 50. As a result, the signal levels at the terminals K and J are both high. Between the times $t_1$ and $t_5$ or after the time $t_6$, the cleared state of the flip-flop 50 is cancelled and the $\overline{Q}$-output signal of the flip-flop 50 is inverted to the low level at a point when the signal $\overline{p}$ is applied to the clock terminal CK thereof. Accordingly, when the signal $\overline{p}$ is applied to the clock terminal CK of the flip-flop 50 at the time $t_2$, the $\overline{Q}$-output signal of the flip-flop 50 assumes a low level from the time $t_2$. The $\overline{Q}$-output signal of the flip-flop 50 assumes a low level from the time $t_3$ when the signal $\overline{p}$ is applied to the clock terminal CK of the flip-flop 50 at the time $t_3$. Therefore, a signal q shown in FIG. 6(D) is obtained from the $\overline{Q}$-output terminal of the flip-flop 50. When it is assumed that the level of the signal p remains at the high or low level between the times $t_5$ and $t_8$ as shown in FIG. 6(C), the signal q remains at the high level as shown in FIG. 6(D) between the times $t_5$ and $t_8$ because the signal $\overline{p}$ is not applied to the clock terminal CK of the flip-flop 50 between the times $t_6$ and $t_7$.

The signal q is applied to the other input terminal of the AND circuit 48 which obtains a logical product of the pulse m and the signal q. The AND circuit 48 produces a pulse signal $b_A$ shown in FIG. 6(E) and FIG. 7(A), and this pulse signal $b_A$ is obtained through the output terminal 17a. When the signal $\overline{p}$ is applied to the clock terminal CK of the flip-flop 50 at the time $t_2$, the pulse signal $b_A$ assumes a high level between the times $t_0$ and $t_2$. On the other hand, when the signal $\overline{p}$ is applied to the clock terminal CK of the flip-flop 50 at the time $t_3$, the pulse signal $b_A$ assumes a high level between the times $t_0$ and $t_3$. Further, the pulse signal $b_A$ also assumes a high level between the times $t_5$ and $t_7$. In other words, the pulse signal $b_A$ and the pulse signal b shown in FIG. 3(B) and described in conjunction with the first embodiment are both produced through the output terminal 17, but the pulse signal b is identical to the pulse signal m shown in FIG. 6(B) and will not fall within the predetermined time period T. On the other hand, the pulse signal $b_A$ falls even within the predetermined time period T, when the phase of the horizontal synchronizing pulses within the digital video signal read out from the memory coincides with the phase of the horizontal synchronizing pulses within the digital video signal obtained from the A/D converter 13 and the $\overline{Q}$-output signal $\overline{p}$ of the flip-flop 33 rises.

The $\overline{Q}$-output signal q of the flip-flop 50 is supplied to one input terminal of a NAND circuit 51, and the output signal $\overline{a}$ of the inverter 47 is supplied to the other input terminal of the NAND circuit 51. Hence, a signal r shown in FIG. 6(G) is obtained from the NAND circuit 51. The signal r is supplied to the other input terminal of the OR circuit 49 which obtains a logical sum of the pulse signal n and the signal r and produces a pulse signal $c_A$ shown in FIG. 6(H). The pulse signal $c_A$ is applied to one input terminal of the OR circuit 27 and to one input terminal of the OR circuit 28. Accordingly, the output signal $i_A$ of the multiplexer 38 becomes as shown in FIG. 6(I).

According to the present embodiment, the timing adjusting time period is set to the predetermined time period T which is determined by the time constant of the monostable multivibrator 45. However, even during the timing adjusting time period, the Q-output signal p of the flip-flop 33 assumes a high level so that the $\overline{Q}$-output signal q of the flip-flop 50 assumes a low level when the phase difference between the phase of the horizontal synchronizing pulses within the signal read out from the memory 19 and the phase of the horizontal synchronizing pulses within the signal being reproduced becomes extremely small (at the time $t_2$ or $t_3$ in FIG. 6). Thus, the operation of adjusting the read-out timing from the memory 19 is completed by one of the timing adjustments indicated by $P_1$, $P_2$, and $P_3$ in FIG. 6(I), and the read-out from the memory 19 is ended and the operation is switched to the write-in to the memory 19.

As in the time period between the times $t_6$ and $t_7$, the state in which the read-out from the memory 19 should be switched to the write-in to the memory 19 may not be reached even after the timing adjustments indicated by $P_{11}$, ..., and $P_{14}$ in FIG. 6(I) are performed for the full duration of the predetermined time period T. In this case, the Q-output signal p of the flip-flop 33 remains at low level, and the $\overline{Q}$-output signal q of the flip-flop 50 is maintained at the high level until the time $t_7$. Hence, the read-out from the memory 19 is carried out for the full duration of the predetermined time period T, and the read-out is ended at the time $t_7$. Moreover, the bus line controller 14 selectively produces the output digital signal of the A/D converter 13 relating to the video signal being reproduced by the reproducing rotary head.

When the predetermined time period T is set to a sufficiently long time, the phase difference between the horizontal synchronizing pulses within the signal read out from the memory 19 and the horizontal synchronizing pulses within the signal being reproduced becomes extremely small in most cases because the timing adjustment is continued during the predetermined time period T. Hence, the timing of the horizontal synchronizing pulses within the signal read out from the memory 19 coincides with the timing of the horizontal synchronizing pulses within the signal being reproduced, and the bus line controller 14 selectively produces the digital video signal relating to the video signal being reproduced from the point when the timings coincide.

In a case where a time deviation (a time interval of one field) occurs between the reproduced horizontal synchronizing pulses before and after the one track scanning period depending on the type of VTR, for example, the predetermined time period T (timing adjusting time period) may be set according to the time deviation.

The output pulse signal $i_4$ of the multiplexer 38 is in synchronism with the vertical synchronizing pulses and the equalizing pulses having an interval of 0.5H during the vertical blanking period. The pulse signal $i_4$ is supplied to the equalizing pulse and vertical synchronizing pulse extracting circuit 39 which eliminates the equalizing pulses and the vertical synchronizing pulses from the pulse signal $i_4$ and produces a pulse signal (timing signal) having an interval of 1H through the output terminal 17b. In FIG. 6(I), the time base is shown in an enlarged scale compared to the time base in FIGS. 6(A) through 6(H).

The timing signal obtained from the output terminal 17b and the pulse signal $b_A$ shown in FIG. 7(A) from the output terminal 17a are supplied to the second timing control circuit 18 shown in FIG. 1. The second timing control circuit 18 is supplied with the timing signal from the output terminal 17b and clock pulses which have a repetition frequency equal to the chrominance subcarrier frequency $f_s$ and are obtained by subjecting the shifting pulses applied to the input terminal 37 to a wave-shaping, and produces a signal shown in FIG. 7(B) based on the timing signal and the clock pulses. The signal shown in FIG. 7(B) rises in phase synchronism with the rising edges of the clock pulses, for example. The timing signal from the output terminal 17b is obtained for every 1H ($=227.5/f_s$). But because the chrominance subcarrier frequency $f_s$ is 227.5 times the horizontal scanning frequency $f_H$, the phase of the chrominance subcarrier is inverted for every 1H. However, since the signal shown in FIG. 7(B) rises in phase synchronism with the rise in the clock pulses which have the repetition frequency $f_s$, the phase of the chrominance subcarrier and the phase of the rising edge of the signal shown in FIG. 7(B) constantly satisfy the same relationship. Accordingly, the time interval between an arbitrary rising edge of the signal shown in FIG. 7(B) and a subsequent rising edge of this signal becomes equal to $227/f_s$ or $228/f_s$, but when the timing adjustment described before is made, the time interval between the two successive rising edges of the signal shown in FIG. 7(B) is corrected to $226/f_s$ or $229/f_s$.

The second timing control circuit 18 comprises a D-type flip-flop having a clock input terminal applied with the signal shown in FIG. 7(B) and a data input terminal applied with the pulse signal $b_A$ (identical to the pulse signal $b_A$ shown in FIG. 6(E)) shown in FIG. 7(A), and a Q-output signal $l_4$ of this flip-flop shown in FIG. 7(C) is supplied to the memory 19 and to the bus line controller 14 as the WE signal described before. The read-out from the memory 19 is controlled and the bus line controller 14 is controlled so selectively produce the digital video signal read out from the memory 19 during the high-level period of the signal $l_4$. On the other hand, during the low-level period of the Q-output signal $l_4$ of the flip-flop within the second timing control circuit 18, the write-in to the memory 19 is controlled and the bus line controller 14 is controlled so as to selectively produce the output digital video signal of the A/D converter 13. As may be seen by comparing FIGS. 7(A) and 7(C), the pulse signal $b_A$ and the signal $l_4$ have waveforms which approximately correspond to each other.

According to the present embodiment, the horizontal scanning period during the timing adjusting period T becomes equal to $226/f_s$ or $229/f_s$ which is different from the original correct value of $227.5/f_s$. However, the difference between the value $226/f_s$ or $229/f_s$ and the correct value $227.5/f_s$ is extremely small, and such a small difference will not cause problems from the practical point of view. Accordingly, it is possible to obtain an extremely stable connection between the read out signal and the signal being reproduced when the switching is performed between the read out signal and the signal being reproduced, because the phase of the chrominance subcarrier in the read out signal is approximately the same as the phase of the chrominance subcarrier in the signal being reproduced.

Next, a description will be given with respect to a second embodiment of the video signal processing apparatus according to the present invention by referring to FIGS. 8 through 10. In FIG. 8, those parts which are the same as those corresponding parts in FIG. 1 are designated by the same reference numerals, and their description will be omitted. In the present embodiment, the special reproduction is carried out by moving the tape at a speed which is slower than that at the time of the recording so that a minimum pulse interval of a detection signal shown in FIG. 10 which will be described later occurs with an interval which is greater than one field. In FIG. 8, the output digital video signal of the A/D converter 13 is supplied to a field memory 55 and to the bus line controller 14. During a read-out from the field memory 5, the bus line controller 14 selectively produces the digital video signal read out from the field memory 55. On the other hand, during a write-in to the field memory 55, the bus line controller 14 selectively produces the output digital video signal of the A/D converter 13 relating to the video signal being reproduced. The output digital video signal of the bus line controller 14 is supplied to a first timing control circuit 56 and to the D/A converter 21.

As will be described later, the first timing control circuit 56 is supplied with a detection signal $a_A$ shown in FIG. 10(A) from the input terminal 16, a clock signal from an input terminal 57 having a frequency which is a natural number multiple or ½ the chrominance subcarrier frequency $f_s$, for example, and an output signal of a row address counter within an address signal generating circuit 60, in addition to the output digital video signal of the bus line controller 14. A signal which is used as a reference for controlling the write-in and read-out with respect to the field memory 55 and for controlling the bus line controller 14, is supplied to a second timing control circuit 59 from the output terminal 17a of the first timing control circuit 56.

The first timing control circuit 56 produces from the output terminal 17b thereof the horizontal synchronizing pulses eliminated of the equalizing pulses and the vertical synchronizing pulses, and supplies the horizontal synchronizing pulses to the second timing control circuit 59. Further, a pulse signal obtained by subjecting the vertical synchronizing pulses to a wave-shaping is supplied to the address signal generating circuit 60 from the output terminal 17c of the first timing control circuit 56. The second timing control circuit 59 produces a signal in phase synchronism with the chrominance subcarrier based on the signal from the output terminal 17a, and supplies the produced signal to the bus line controller 14 so as to control the bus line controller 14. Based on the signal from the output terminal 17a, the second timing control circuit 59 also generates the column address strobe (CAS) signal, the row address strobe (RAS) signal, the read/write control signal (WE signal) and the like which are required for the write-in and read-out operations to be carried out with respect to the field memory 55. The CAS signal, the RAS signal, the WE signal and the like are supplied to the field memory 55. Further, the second timing control circuit 59 supplies another signal to the address signal generating circuit 60. The field memory 55 is a random access memory (RAM), for example, and has a memory capacity for storing digital video signal corresponding to one field. The digital video signal read out from the field memory 55 is supplied to the bus line controller 14, and the digital video signal from the A/D converter 13 is written into the field memory 55.

The address signal generating circuit 60 generates an address signal for designating a write-in address or a read-out address and supplies the address signal to the field memory 55. The address signal generating circuit 60 comprises a row address counter for designating a scanning line position within the picture which is to be displayed from the digital video signal which is written in or read out from the field memory 55, a column address counter for designating the position of the picture element among the plurality of picture elements in one scanning line and the like. The row address counter is cleared by the signal from the output terminal 17c having a period of one field as shown in FIG. 10(A) which will be described later. The column address counter is supplied with the signal from the output terminal 17b having a period of 1H, and produces from this signal a pulse signal in phase synchronism with the chrominance subcarrier. The column address counter is also cleared by the signal from the output terminal 17c. In the present embodiment, an output address signal of the row address counter is supplied to the field memory 55 and to the first timing control circuit 56.

When the detection signal from the input terminal 16 assumes a high level at an intermediate point in each field of the output digital video signal of the A/D converter 13, the second timing control circuit 59 controls the field memory 55 to perform a write-in operation and controls the bus line controller 14 to selectively produce the output digital video signal of the A/D converter 13 based on the output signal of the first timing control circuit 56 only for a time period of one field from a point when the vertical synchronizing pulses within the next output digital video signal of the bus line controller 14 is received. During other time periods, the second timing control circuit 59 controls the field memory 55 to perform a read-out operation and controls the bus line controller 14 to selectively produce the digital video signal read out from the field memory 55.

The digital video signal obtained from the bus line controller 14 is supplied to the D/A converter 21 wherein the digital video signal is subjected to a digital-to-analog conversion and is converted back into a composite video signal having the original analog signal format. The output composite signal of the D/A converter 21 is passed through the amplifier 22 and is obtained through the output terminal 23. As a result, a frame advance picture of a high picture quality can be obtained from the composite video signal which has no deterioration in the S/N ratio and is obtained from the output terminal 23.

The field memory 55 and the bus line controller 14 are controlled by the output signals of the second timing control circuit 59 and the address signal generating circuit 60. However, the signal which is used as the reference for forming the signals for control is obtained from the first timing control circuit 56. Next, a description will be given with respect to the construction and operation of the first timing control circuit 56 which constitutes an essential part of the present embodiment.

In FIG. 9, those parts which are the same as those corresponding parts in FIG. 2 are designated by the same reference numerals. In FIG. 9, the output digital video signal of the bus line controller 14 is supplied to the input terminal 30 and is supplied to the horizontal synchronizing pulse extracting circuit 34 and to the vertical synchronizing pulse extracting circuit 40. The vertical synchronizing pulses s shown in FIG. 10(H) extracted in the extracting circuit 40 are supplied to the wave shaping circuit 41. The wave shaping circuit 41 detects the rising edges of the vertical synchronizing pulses s and produces a pulse signal $k_A$ shown in FIG. 10(A). As shown in FIG. 10(A), the pulse signal $k_A$ has an extremely narrow low-level period and has a period of one field. The pulse signal $k_A$ is produced through the output terminal 17c. Further, the pulse signal $k_A$ is supplied to a clear terminal of a J-K flip-flop 65, a clear terminal of a row address counter 62 within the address signal generating circuit 60, and to a clock terminal of a J-K flip-flop 69.

A clock signal having a period of 1H is applied to an input terminal 61, and the row address counter 62 counts the pulses of the clock signal. A counted value in the row address counter 62 is supplied to the field memory 55 and to a gate circuit 63 within the first timing control circuit 56. The gate circuit 63 converts the counted value into a pulse signal u shown in FIG. 10(C) which assumes a high level only during a predetermined time period (an arbitrary time period of 40H to 50H, for example) in the vicinity of the center part of each field of the output digital video signal of the A/D converter 13. The pulse signal u is supplied to a NAND circuit 64 which is also supplied with the detection signal $a_A$ from the input terminal 16. It will be assumed that the pulse signal $a_A$ assumes a high level in each of the time periods in which the first, third, fifth, and eighth fields are reproduced and in a time period spanning the sixth and seventh fields, as shown in FIG. 10(B). In addition, it will be assumed that the detection signal $a_A$ obtained in the first, third, and eighth fields exists at the intermediate part of the respective fields. In FIG. 10(A), the numbers in brackets above the waveform represent the sequence of the fields of the output digital video signal of the A/D converter 13, that is, the sequence of the fields of the composite video signal being reproduced from the tape. In FIG. 10(H), the numbers within the waveform of the vertical synchronizing pulses represent the sequence of the fields of the output digital video signal of the bus line controller 14 which is controlled as will be described later.

The NAND circuit 64 which is supplied with the detection signal $a_A$ and the pulse signal u, produces a pulse signal v shown in FIG. 10(D). The pulse signal v is applied to a clock terminal of the flip-flop 65 and operates the flip-flop 65 by the falling edge thereof, for example. A positive D.C. voltage $V_{cc}$ is applied to a terminal J of the flip-flop 65, and a $\overline{Q}$-output signal of the flip-flop 65 is applied to a terminal K of the flip-flop 65. Accordingly, after the flip-flop 65 is cleared by the pulse signal $k_A$, a Q-output signal of the flip-flop 65 remains at a low level (that is, the flip-flop 65 remains in the cleared state) unless the pulse signal v is applied to the clock terminal of the flip-flop 65. The Q-output signal of the flip-flop 65 which remains in the cleared state is inverted at a point when a first falling edge of the pulse signal v is received through the clock terminal of the flip-flop 65. Thereafter, the Q-output signal of the flip-flop 65 remains at the high level until the next pulse signal $k_A$ is applied to the clear terminal of the flip-flop 65, even when the second and subsequent falling edges of the pulse signal v are received through the clock terminal of the flip-flop 65.

Accordingly, the flip-flop 65 produces from the Q-output terminal thereof a pulse signal w shown in FIG. 10(E) which rises at the times $t_{11}$, $t_{14}$, and $t_{17}$ when both the detection signal $a_A$ and the pulse signal u assume high levels and falls at the times $t_{12}$, $t_{15}$, and $t_{18}$ when the pulse signal $k_A$ of the first vertical synchronizing pulse after each of the times $t_{11}$, $t_{14}$, and $t_{17}$ is received. As described before, the minimum pulse interval of the detection signal $a_A$ is greater than the time period of one field. Further, the detection signal $a_A$ is not received for a time period of at least one field after the times $t_{12}$, $t_{15}$, and $t_{18}$. The pulse signal w is supplied to a data input terminal of a D-type flip-flop 66 and to one input terminal of a 2-input exclusive-OR circuit 67. A clock signal having a frequency which is a natural number multiple or ½ the chrominance subcarrier frequency $f_s$ is supplied to a clock terminal of the flip-flop 66 from the input terminal 57. The flip-flop 66 produces from a Q-output terminal thereof a signal which is obtained by sampling the pulse signal w by the clock signal from the input terminal 57. The Q-output signal of the flip-flop 66 is supplied to the other input terminal of the exclusive-OR circuit 67 and to one input terminal of a 2-input NAND circuit 68.

An output signal of the exclusive-OR circuit 67 is supplied to the other input terminal of the NAND circuit 68. Thus, the NAND circuit 68 produces a pulse signal x shown in FIG. 10(F) which assumes a low level in phase synchronization with the rising edge of the pulse signal w and has a narrow pulse width. The pulse width of the pulse signal x is determined by the period of the clock signal applied to the input terminal 57. The pulse signal x is applied to a clear terminal of the flip-flop 69 and clears the flip-flop 69 by a falling edge thereof. The positive D.C. voltage $V_{cc}$ is supplied to a terminal J of the flip-flop 69 and a $\overline{Q}$-output signal of the flip-flop 69 is supplied to a terminal K of the flip-flop 69, as in the case of the flip-flop 65 described before. Accordingly, the Q-output signal of the flip-flop 69 is inverted by the pulse signal $k_A$ supplied to the clock terminal of the flip-flop 69, and the state of the flip-flop 69 is maintained until the pulse signal x is received. Hence, a pulse signal $b_B$ shown in FIG. 10(G) is obtained from the Q-output terminal of the flip-flop 69. As shown in FIG. 10(G), the pulse signal $b_B$ assumes a low level at the times $t_{12}$, $t_{15}$, and $t_{18}$ when the falling edge of the pulse signal x is received, and the pulse signal $b_B$ maintains the low level until the times $t_{13}$ and $t_{16}$ when the pulse signal $k_A$ of the first vertical synchronizing pulse after each of the times $t_{12}$, $t_{15}$, and $t_{18}$ is received. The pulse signal $b_B$ assumes a high level at the times $t_{13}$ and $t_{16}$.

The detection signal $a_A$ and the pulse signal u simultaneously assume high levels at the times $t_{11}$, $t_{14}$, and $t_{17}$. Thus, the pulse signal $b_B$ assumes a low level during a time period of one field after each of the times $t_{12}$, $t_{15}$, and $t_{18}$ when the pulse signal $k_A$ next to the respective times $t_{11}$, $t_{14}$, and $t_{17}$ is received, and assumes a high level during other time periods. The pulse signal $b_B$ is supplied to the second timing control circuit 59 through the output terminal 17a. The high-level period of the pulse signal $b_B$ approximately corresponds to the read-out time period of the field memory 55, and the low-level period of the pulse signal $b_B$ approximately corresponds to the write-in time period of the field memory 55.

As in the case of the second timing control circuit 18 described before, the second timing control circuit 59 produces a pulse signal $l_B$ similar to the pulse signal $l_A$ shown in FIG. 7(A) from the signal received through the output terminal 17a, the clock pulses having the chrominance subcarrier frequency $f_s$, and the pulse signal $b_B$ from the output terminal 17b. The pulse signal $l_B$ is supplied to the field memory 55 and to the bus line controller 14. During a low-level period of the pulse signal $l_B$, the field memory 55 is controlled to perform a write-in operation and the bus line controller 14 is controlled to selectively produce the output digital video signal of the A/D converter 13. On the other hand, during a high-level period of the pulse signal $l_B$, the field memory 55 is controlled to perform a read-out operation and the bus line controller 14 is controlled to selectively produce the digital video signal read out from the field memory 55.

The waveform of the pulse signal $l_B$ is approximately the same as the waveform of the pulse signal $l_A$, and is identical to the waveform of the pulse signal $l_A$ when the phase of the chrominance subcarrier is not considered. Accordingly, it will be assumed that the high-level period of the pulse signal $b_B$ corresponds to the read-out time period of the field memory 55 and the low-level period of the pulse signal $l_B$ corresponds to the write-in time period of the field memory 55. In this case, the field memory 55 is controlled to perform the write-in during the low-level period of the pulse signal $b_B$ shown in FIG. 10(G) and is controlled to perform the read-out operation during the high-level period of the pulse signal $l_B$. Hence, as indicated by W2 in FIG. 10(G), the digital video signal which is related to the second field and includes no deterioration in the S/N ratio is written into the field memory 55 during the time period of one field between the times $t_{12}$ and $t_{13}$. Since the detection signal $a_A$ is received during the time period of the third field between the times $t_{13}$ and $t_{15}$, the digital video signal related to the second field is read out from the field memory 55 as indicated by R2 in FIG. 10(G). During the next time period of the fourth field, the digital video signal being reproduced which is related to the fourth field and includes no deterioration in the S/N ratio is written into the field memory 55 as indicated by W4 in FIG. 10(G). Because the detection signal $a_A$ is received in each field during the time periods of the fifth through eighth fields between the times $t_{16}$ and $t_{18}$, the digital video signal stored in the time period of one field between the times $t_{15}$ and $t_{16}$ is repeatedly read out from the field memory 55 four times as indicated by R4 in FIG. 10(G). Therefore, a reproduced composite video signal which is related to the frame advance picture and includes no deterioration in the S/N ratio is obtained from the output terminal 23.

Further, the present invention is not limited to these embodiments, but various variations and modifications may be made without departing from the scope of the present invention.

In the embodiments described heretofore, the video signal processing apparatus according to the present invention is applied to the helical scan type VTR for convenience's sake. However, the video signal processing circuit according to the present invention may be applied to a video disc player which has the function of carrying out a frame advance reproduction, for example.

What is claimed is:

1. A video signal processing apparatus for processing a video signal at the time of a special reproduction mode in which a reproduced video signal is obtained by demodulating a frequency modulated signal reproduced from pre-recorded tracks on a recording medium, said recording medium being moved during said special reproduction mode at such a speed that a relative speed between a reproducing element and said recording medium is different from that at the time of a recording so that the envelope level of the reproduced frequency modulated signal is greater than a predetermined level during a time period which is one track scanning period before a time period in which the envelope level of the frequency modulated signal reproduced from an arbitrary track is smaller than said predetermined level, said video signal processing apparatus comprising:
- an analog-to-digital converter for converting a video signal reproduced from said recording medium into a first digital video signal;
- a memory at least having a memory capacity for storing said first digital video signal corresponding to one field;
- switching means for selectively producing said first digital video signal or a second digital video signal read out from said memory;
- first timing control means supplied with said first and second digital video signals and a detection signal which indicates a specific time period in which the envelope level of the frequency modulated signal becomes smaller than said predetermined level for at least generating first and second pulse signals, said first pulse signal having a pulse width corresponding to a predetermined time period made up of the specific time period and a constant time period in a vicinity of the specific time period, said second pulse signal being generated by detecting a relative phase difference between horizontal synchronizing signals of said first and second digital video signals within said constant time period and determining a read-out timing of said memory so that the phase difference decreases;
- second timing control means supplied with said first and second pulse signals for causing a read-out from said memory, causing said switching means to selectively produce said second digital video signal, and controlling a read-out timing of said memory by a signal based on said second pulse signal during a first time period approximately corresponding to a pulse width of said first pulse signal, and for causing said switching means to selectively produce said first digital video signal and causing a write-in of said first digital video signal into said memory during a second time period other than said first time period; and
- a digital-to-analog converter for subjecting said first or second digital video signal produced from said switching means to a digital-to-analog conversion so as to obtain a reproduced composite video signal.

2. A video signal processing apparatus as claimed in claim 1 in which said second timing control means comprises a latch circuit for latching said second pulse signal by independently produced clock pulses having the chrominance subcarrier frequency, and a read-out/write-in control signal for said memory and a switching signal for said switching means are generated based on an output signal of said latch circuit.

3. A video signal processing apparatus as claimed in claim 1 in which said first timing control means comprises a control circuit for generating as said first pulse signal a pulse signal having a pulse width lasting for said constant time period from a time when said detection signal is received and for generating a third pulse signal having a predetermined level in a time period corresponding to said constant time period, a first extracting circuit for extracting horizontal synchronizing pulses within said first digital video signal, a second extracting circuit for extracting horizontal synchronizng pulses within said first or second digital video signal obtained from said switching means, a circuit for extracting vertical synchronizing pulses within said first or second digital video signal obtained from said switching means and for supplying a signal obtained by wave-shaping the vertical synchronizing pulses to said second timing control means, a shift register for shifting an output signal of said second extracting circuit by clock pulses having a predetermined frequency and for obtaining at least three shift signals the phases of which differ by one period of said clock pulses, latch means for latching by the output signal of said second extracting circuit a fourth pulse signal of one horizontal scanning period obtained by wave-shaping an output signal of said first extracting circuit, selecting means supplied with said third pulse signal, a fifth pulse signal obtained from said latch means, and the shift signals from said shift register for selectively producing one shift signal among the three shift signals depending on the phase difference between the output signals of said first and second extracting circuits, and a circuit for wave-shaping an output pulse signal of said selecting means so as to obtain said second pulse signal.

4. A video signal processing apparatus as claimed in claim 3 in which said control circuit comprises a pulse generating circuit for generating a sixth pulse signal which assumes a predetermined level only for said constant time period from a time when said detection signal is no longer received, a logic circuit for generating from said detection signal and said sixth pulse signal a seventh pulse signal which assumes a predetermined level only for said predetermined time period which is the sum of the pulse width of said detection signal and said constant time period, and a circuit supplied with said detection signal and said fifth pulse signal for generating as said first pulse signal a pulse signal having a leading edge at the time when said detection signal is received and having a trailing edge at a time when the level of said fifth pulse signal changes within a time period in which said detection signal is not received and having a trailing edge at a time when said constant time period has lapsed when the level of said fifth pulse signal does not change, and for generating as said third pulse signal a pulse signal which is formed based on said sixth pulse signal.

5. A video signal processing apparatus as claimed in claim 1 in which said analog-to-digital converter is supplied with a reproduced video signal which is obtained by demodulating a frequency modulated signal reproduced from said recording medium which is moving at such a speed that a minimum pulse interval of said detection signal is greater than a time period of one field, said first timing control means comprises a circuit supplied with clock pulses having a frequency related to the chrominance subcarrier frequency, the output signal of said switching means, said detection signal, and an address signal obtained from said second timing control means for forming an eighth pulse which assumes a predetermined logical value for every time period in a vicinity of an intermediate part in each field of the first digital video signal obtained from said analog-to-digital converter, and for generating a ninth pulse signal which assumes a certain logical value only for a time period of one field from a time when a first vertical synchronizing pulse within the output digital video signal of said switching means is received next to the receipt of said detection signal when said eighth pulse signal assumes said predetermined logical value, and a circuit for wave-shaping the horizontal synchronizig pulses and the vertical synchronizing pulses within the output digital video signal of said switching means and for producing the shaped pulses, and said second timing control means comprises a circuit supplied with the output pulse signals of said first timing control means for generating a control signal which causes said memory to perform a write-in operation during a time period of one field corresponding to a time period in which said ninth pulse signal assumes said certain logical value and causes said memory to perform a read-out operation during other time periods.

6. A video signal processing apparatus as claimed in claim 5 in which said first timing control means comprises a gate circuit for generating said eighth pulse signal from the address signal of one horizontal scanning period obtained from said second timing control means, a logic circuit for generating a tenth pulse signal which assumes a specific logic value only when said detection signal is received when said eighth pulse signal assumes said predetermined logic value, a first circuit for supplying to said second timing control means a first signal which is obtained by extracting and wave-shaping the horizontal synchronizing pulses within the output digital video signal of said switching means, a second circuit for supplying to said second timing control means a second signal which is obtained by extracting and wave-shaping the vertical synchronizing pulses within the output digital video signal of said switching means, a flip-flop supplied with said tenth pulse signal and said second signal for generating an eleventh pulse signal having a pulse width determined by a time when said tenth pulse signal assumes said specific logic value and a time when said flip-flop is cleared by said second signal, and a circuit for generating said ninth pulse signal which assumes said certain logic value during a time period of one field between a trailing edge of said eleventh pulse signal and a time when the next second signal is received.

7. A video signal processing apparatus as claimed in claim 6 in which said circuit for generating said ninth pulse signal comprises a latch circuit for latching said eleventh pulse signal by clock pulses having a frequency related to the chrominance subcarrier frequency.

* * * * *